United States Patent
Nitsche et al.

[19]

[11] Patent Number: 5,946,984
[45] Date of Patent: Sep. 7, 1999

[54] METHOD AND APPARATUS FOR GEAR SHIFTING CONTROL WITH IMPROVED SHIFT QUALITY DURING GEAR SHIFTING

[75] Inventors: Martin Nitsche, Gerstetten; Andreas Englisch, Heidenheim, both of Germany

[73] Assignee: Voith Turbo GmbH & Co., KG, Heidenheim, Germany

[21] Appl. No.: 09/117,646

[22] PCT Filed: Nov. 28, 1997

[86] PCT No.: PCT/EP97/06646

§ 371 Date: Dec. 7, 1998

§ 102(e) Date: Dec. 7, 1998

[87] PCT Pub. No.: WO98/25054

PCT Pub. Date: Jun. 11, 1998

[30] Foreign Application Priority Data

Dec. 4, 1996 [DE] Germany ............................ 196 50 339
Jan. 15, 1997 [DE] Germany ......................... 297 00 605 U

[51] Int. Cl.⁶ ........................... F16H 61/04; F16H 61/64; F16D 33/06
[52] U.S. Cl. ............................................ 74/733.1; 475/50
[58] Field of Search ...................... 475/48, 50; 74/733–1

[56] References Cited

U.S. PATENT DOCUMENTS

| | | | |
|---|---|---|---|
| 3,673,799 | 7/1972 | Audiffred et al. ........................... | 60/54 |
| 3,948,367 | 4/1976 | Weinrich et al. .......................... | 475/48 |
| 4,184,386 | 1/1980 | Forster ....................................... | 475/50 |
| 4,615,239 | 10/1986 | Hirt et al. ................................... | 475/48 |
| 5,303,616 | 4/1994 | Palansky et al. .......................... | 74/890 |
| 5,474,506 | 12/1995 | Palansky et al. .......................... | 477/63 |

FOREIGN PATENT DOCUMENTS

| | | | |
|---|---|---|---|
| 0 478 585 A1 | 3/1992 | European Pat. Off. ........ | F16H 61/06 |
| 691 13 193T2 | 2/1996 | Germany ......................... | F16H 61/06 |
| 297 00 605 U | 5/1998 | Germany ......................... | F16H 47/06 |

OTHER PUBLICATIONS

"Voith—Hydrodynamic in Drive Technology", Krauskopf Engineering Digest 1987, Chapter "Control and Adjustments".

*Primary Examiner*—Dirk Wright
*Attorney, Agent, or Firm*—Taylor & Associates, P.C.

[57] ABSTRACT

An apparatus for gear shifting control with improved shift quality during gear shifting includes a gearbox unit containing at least one gear branch for power transfer via a hydrodynamic clutch. The hydrodynamic clutch can be coupled in series with a mechanical gearing part containing a device for realizing at least two speeds. In the course of power transfer via the hydrodynamic clutch during a gear shift operation between two mechanical speeds, the fill factor of the hydrodynamic clutch is so altered that a variable which at least indirectly characterizes the rotational speed of the primary bucket wheel of the hydrodynamic clutch is held substantially constant over a certain range of the gear shift operation.

15 Claims, 4 Drawing Sheets

METHOD AND APPARATUS FOR GEAR SHIFTING CONTROL WITH IMPROVED SHIFT QUALITY DURING GEAR SHIFTING

BACKGROUND OF THE INVENTION

1. Field of the Invention

The present invention relates to a method and apparatus for gear shifting control with improved shift quality during changing from a first gear to a second gear, especially when upshifting.

2. Description of the Related Art

Hydrodynamic-mechanical gear box units are known in a multitude of designs in the form of automatic transmissions for use in motor vehicles. They contain at least one gear branch, which includes a hydrodynamic clutch and a mechanical transmission section, installed in tandem with the clutch. The mechanical transmission section includes rotational speed/torque converters with an appropriate gear ratio, which can be operated through appropriate control elements. Various speeds are achieved by appropriate operation and/or releasing of control elements in the mechanical transmission section. The individual rotational speed/torque converters are preferably in the form of spur gear or planetary gear sets. To shift gears, it is necessary to actuate or release the appropriate control elements of the mechanical transmission section. When shifting up in an automatic transmission, for example, two phases occur, namely the so-called torque phase and an inertia phase. Before the upward shift is effected, the torque input at the transmission clutches includes only the torque which is produced by the combustion engine and which runs through a torque converter. During the torque transfer phase, pressure is exerted on the clutch part that is to be engaged. This torque is divided between the releasing clutch and the engaging clutch. At the end of the torque phase, the torque that is supported by the releasing clutch drops to zero, and the entire torque is transferred to the engaging clutch. After completion of the torque transfer, the phase of transferring the gear ratio, the so-called inertia phase, begins. During this phase, the rotational speed of the combustion engine is quickly reduced to the value of the new gear ratio. This occurs to the same degree in which the pressure of the engaging clutch increases. This produces a large moment of inertia which must be absorbed by the clutch part in addition to the torque that is produced by the combustion engine. This inertia torque produces a torque thrust which is transmitted to the interior of, for example, a vehicle.

A multitude of options are known for the reduction of the torque thrust. One of these options is described as an example in German patent document no. DE 691 13 193 T2. According to the disclosure, control of the shifting procedure is provided by continuously monitoring the input speed at the transmission input shaft and by comparing a change at the end of the torque phase with a stored value. Preferably, the control is improved by delaying the motor's timing of ignition by a certain time. An adaptive control system is provided to adjust the pressure in a device intended for the generation of torque by use of friction for a drive train, which includes a combustion motor and a step-up gear. The system further includes a shaft for input of the torque between the combustion engine and the gear box, an initial friction mechanism for at least partial provision of a first transfer path for the torque between the drive shaft and primary parts of the transmission for the input of torque, and a second friction mechanism which serves to transfer the torque between the drive shaft and secondary parts of the transmission. The system further includes a primary and a secondary pressure operated servo unit which, when under pressure, will operate the first and the second friction mechanisms respectively, whereby the creation of the second transfer path for torque is accompanied by a reduced motor speed. Also included is a device for constantly monitoring the speed at the torque input shaft, that is, at the transmission input shaft, and a device for increasing the pressure of the second servo unit as a response to a command to change the transmission ratio, which requires release of the first friction mechanism and actuation of the second friction mechanism. The system further includes a device for reduction of pressure in the servo unit, as a response to a predetermined measured change in the rotational speed of the torque input shaft, and a device to increase pressure in the servo unit as a result of the reduction in the clutch ability of the first friction mechanism during the shifting procedure. The disadvantage of such a control system is essentially that the necessary adaptation of the pressure progression must occur very sensitively and is therefore very expensive. Adaptation of the pressure value is furthermore always opposite the actual factors at the transmission input shaft, particularly depending on the rotational speed at the transmission input shaft. Changes in the speed and the mass moment of inertia of the combustion engine influence the necessary adaptation of the pressure progression.

SUMMARY OF THE INVENTION

The present invention provides a method and apparatus for controlling gear shifts on hydrodynamic-mechanical gear boxes such that the mentioned disadvantages are avoided. In particular, a high level of shifting comfort is achieved with little or no moment distortion during shifting, which is caused by rotational speed changes and the mass moment of inertia of the combustion engine. Design and control expenditures are kept as low as possible.

The present invention relates to a method and apparatus for improving the shifting quality during gear shifting, i.e., shifting between two speeds in a transmission. The transmission contains at least one gear branch for power transfer via a hydrodynamic clutch, which can be coupled in series with a mechanical transmission section in the power transfer branch, containing devices for realizing at least two speeds. During the shifting procedure between two mechanical speeds in the hydrodynamic-mechanical power transfer transmission branch, the fill factor of the hydrodynamic clutch is monitored and adjusted in such a manner that a variable, which at least indirectly characterizes the rotational speed of the pump wheel of the hydrodynamic clutch, is held substantially constant over a certain range of the shifting operation. Consequently, at the beginning of the shifting operation, control of the rotational speed of the pump wheel starts through appropriate filling control at the hydrodynamic clutch, whereby the speed level prior to shifting is maintained. A firmly definable desired rotational speed, which may be established for every shifting operation may also serve as a comparison or desired value.

In known methods, shifting between individual gears during pull-upshifting, that is, when changing from a first lower gear into a second higher gear, normally leads to a suppression of the rotational speed. The reduction of the rotational speed occurs at least at the primary bucket wheel and the components coupled with this, in particular the machine drive shaft. With the method of the present invention, however, the rotational speed of the pump wheel is controlled to an almost constant value, and the hydrodynamic clutch becomes softer and allows the necessary slippage to occur naturally in the hydrodynamic clutch. Because of this, in the shifting process during changeover of the power transfer unit and/or the ratio of rotational speed/torque in the mechanical driving gear, no changes in the rotational speed occur at the transmission input shaft or in the drive motor coupled with it. Shifting itself can be accomplished smoothly and without great pressure build-up. A reduction of slippage is again achieved by the change in the driving speed or the forcible hardening of the hydrodynamic clutch, particularly through increase in filling, under consideration of the minimal acceptable rotational speed of the drive motor. The time span for the control process can be from the beginning of the shifting process to the time of reaching the synchronous rotational speed. However, the time span can also be chronologically displaced from the beginning of the shifting process. Alternatively, the time span can be completed when a certain slippage value, that is, a certain difference between the rotational speeds of the primary bucket wheel and the secondary bucket wheel on the hydrodynamic clutch is reached. Preferably, the control process is concluded only then, when the slippage has been reduced to a minimum. Normally, this would be two or three percent of the slippage level normally prevailing in hydrodynamic transfer of power. The drive motor may then speed up further, while the hydrodynamic clutch operates again at maximum efficiency.

The method of the present invention is generally suitable for all gear shift operations in transmissions in which the hydrodynamic clutch is not equipped with beveled blading and participates in the transfer of power.

On clutches that are equipped with beveled blading, the method of the invention is preferable for improvement of the gear shifting quality in pull upshifting. In push-upshifting, pull-reverse shifting and push-reverse shifting, such a control system is normally unnecessary. In push operation, in which a filled hydrodynamic clutch that is equipped with beveled blading is turned on, the drive motor coupled with the transmission input shaft and, therefore, the primary bucket wheel of the hydrodynamic clutch cannot be dragged. In this scenario, the hydrodynamic clutch operates in a centrifugal mode when driving the secondary bucket wheel through the transmission output side. The vehicle rolls without braking too harshly when the gas supply is interrupted, i.e., there is no load change impact and the drive motor runs with slightly increased idling speed. The behavior of the hydrodynamic component corresponds to that of a hydrodynamic rotational speed/torque converter. Push up-shifting situations have substantially no effect on the drive motor coupled to the transmission input shaft and are therefore barely noticeable.

In traction operation, the motor normally supports itself at the secondary bucket wheel during transfer of power in the hydrodynamic-mechanical power transfer branch. This also applies to reverse shifting, during which the rotational speed of the secondary bucket wheel increases. The motor speed cannot be increased by the selected gear. The hydrodynamic clutch again operates in a centrifugal mode, which is why the motor mass cannot negatively influence the shifting process.

With regard to push-reverse shifting with transmission arrangements having a hydrodynamic clutch equipped with beveled blading, the same comments apply as for push-upshifting. Here too, the motor speed is not affected by the gear shifting operations.

The method of the invention provides the advantage that lower drive motor speeds are attained by matching the output of the drive motor with the desired driving performance. Overall, a higher level of efficiency is achieved under driving conditions. Because of the displacement of slippage or compensation for slippage during gear changes into the hydrodynamic clutch, the individual shifting components necessary for achieving the individual speeds are far less stressed. Since during the gear shifting process no moment distortions occur which would be caused by changes in the rotational speeds and by mass moments of inertia, the gear shifting process proceeds almost smoothly which manifests itself in increased gear shifting comfort. Very low shifting speeds may be selected, since the rotational speed of the drive motor does not change during shifting. The progression of rotational speed of the drive motor during gear shifting with hydrodynamic clutch is constant.

The device includes a gear box unit having a first hydrodynamic gear component with at least a primary and a secondary bucket wheel, which together form a toroidal operating chamber and function as a hydrodynamic clutch. The gear box unit also has a second mechanical gear component with at least a device for achieving two different speeds, and control or regulating equipment. The control or regulating unit includes at least two inputs and one output in order to achieve operation consistent with the invention. A first input is coupled with a device to measure or establish a signal for the presence of a shifting process. A second input is coupled with a device capable of measuring at least one value which at least indirectly characterizes the average rotational speed of the primary bucket wheel of the hydrodynamic clutch. The value at least indirectly characterizing the average rotational speed of the hydrodynamic clutch of the primary bucket wheel is compared with a desired value which is preferably consistent with the value of the rotational speed measurable at the beginning of a gear change, or with the indirectly characterized rotational speed value of the primary bucket wheel. Depending upon the deviation between the actual and the desired value, a variable Y is formed which serves to trigger a device to change the degree of fill of the hydrodynamic clutch. Changing the degree of fill can be accomplished through a control or regulating unit. The control or regulating unit is secondary to the rotational speed control for the primary bucket wheel.

The following options exist for regulating the degree of fill:
a) Controlling the degree of fill within the scope of the rotational speed control; or
b) Controlling the degree of fill within the scope of degree of fill control which is secondary to a rotational speed control.

For details on the execution of rotational speed control, we refer to the comments in "Voith—Hydrodynamic in drive technology", Krauskopf Engineering Digest 1987, Chapter "Control and adjustments", which is incorporated herein by reference. The adjustment of the degree of fill or realization of rotational speed adjustments is not limited by a concrete implementational example. It is, however, important that a value which represents at least an indirectly characterized rotational speed of the pump wheel is set during the initial speed levels, and that this value is held constant.

The transmission of the present invention displays good efficiency throughout the entire range and no disadvantages are noted regarding shifting comfort and driving characteristics when compared with currently known transmissions. During the operational condition of "driving", the hydrodynamic clutch component is preferably operated with maximum fill since there can be only minimal slippage. The clutch therefore provides excellent efficiency which, depending upon load and rotational speed, may be between 90 and 99%. These values are not achieved by any hydrodynamic converter. The hydrodynamic component which operates as a clutch during the start up process shifts hard. In spite of this, it remains a hydraulic transfer component with all its advantages, for example damping of vibration and noise reduction. In all subsequent shifting sequences, the slippage of the hydrodynamic component is increased, and shifting is softer and achieves values which are consistent at least with the slippage of a hydrodynamic converter. Shifting of individual gears in the first operational condition may be rapid. The slippage can be displaced into the hydrodynamic component and may then be reduced again by increasing the degree of fill. Thereby, comfortable transitions are achieved for realization of the individual speeds, while at the same time reducing the load on the shifting elements.

Even with suddenly occurring load changes, the slippage of the hydrodynamic component may be increased for a short period, so that a soft hydraulic connection results. Also, the support in push operation is very low. The dreaded load change impact is then a non-event. In addition, the characteristic curve of the utilized flexible damper displays better characteristics during load changes. The hydrodynamic component is then bridged in the operational condition of "driving", when shifting between the individual gears no longer causes loss of shifting comfort. This function is ensured by appropriate control of the filling and emptying processes.

In the braking mode, the hydrodynamic clutch can be utilized as a retarder.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
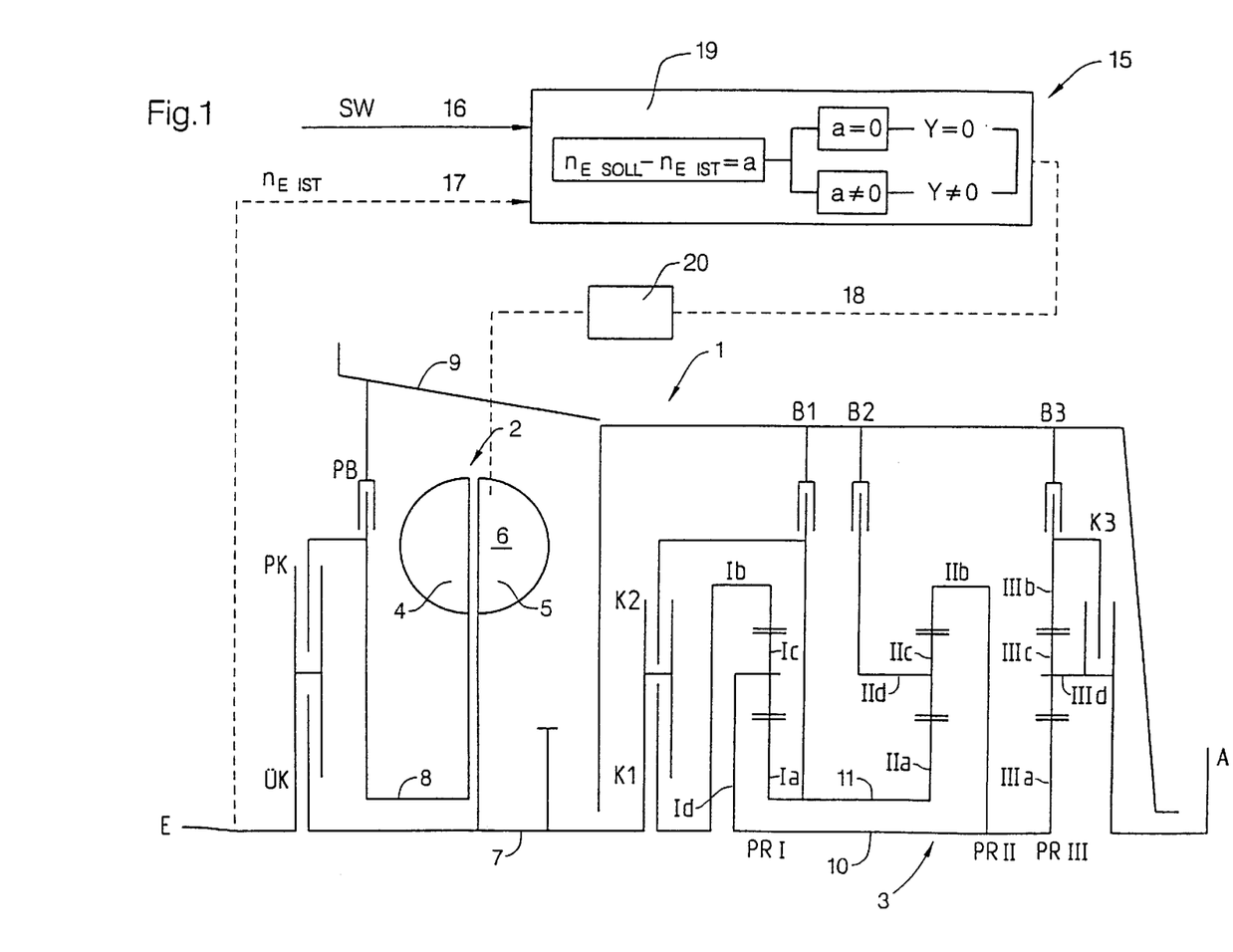
FIG. 1 is a simplified, schematic view of one embodiment of an apparatus of the present invention.
Figure 2A:
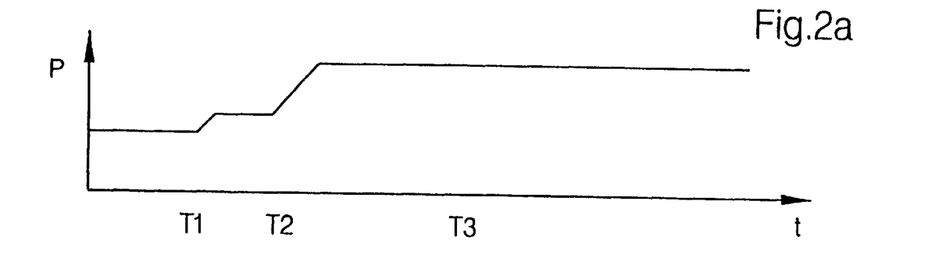
FIG. 2a is a plot of the pressure exerted on coming control elements in a conventional transmission versus time.
Figure 2B:
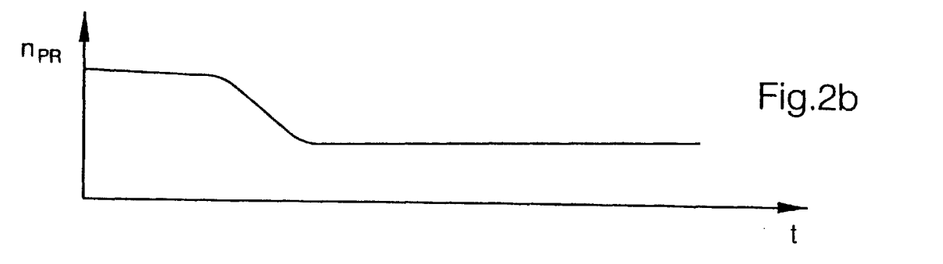
FIG. 2b is a plot of the rotational speed on the drive side of a conventional transmission versus time.
Figure 2C:
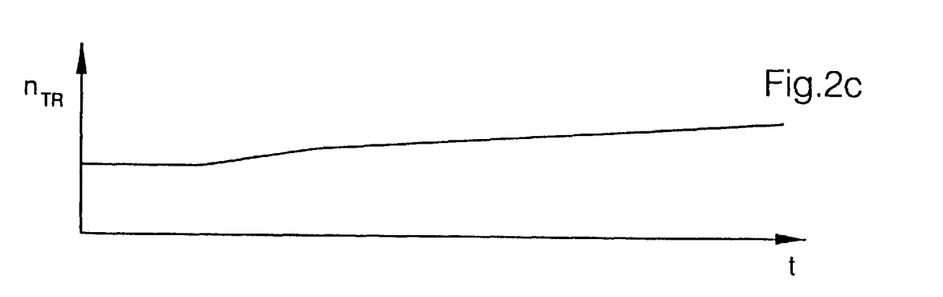
FIG. 2c is plot of the rotational speed on the output side of a conventional transmission versus time.
Figure 2D:
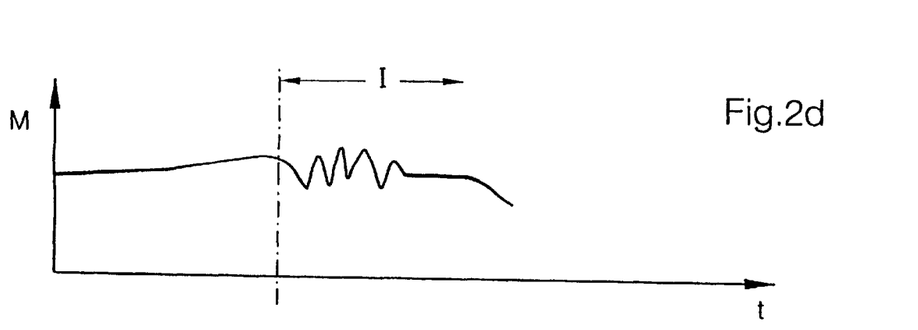
FIG. 2d is plot of torque within a conventional transmission versus time.

Referring now to the drawings and particularly to FIG. 1, there is shown an example transmission, including a first hydraulic transmission section 2 in the form of a hydrodynamic clutch and a second mechanical transmission section 3, the functional mode of the method in accordance with the invention. The first hydraulic transmission section 2 includes at least two bucket wheels—the first bucket wheel and a second bucket wheel. The first bucket wheel is described as primary bucket wheel 4 and the second bucket wheel as secondary bucket wheel 5. The primary bucket wheel 4 and the secondary bucket wheel 5 together, form at least one toroidal work chamber 6, which can be filled with operating medium. For this purpose, an operating medium supply unit which is not shown in detail, is allocated to the toroidal work chamber 6. The gear box unit 1 is designed so that the hydrodynamic transmission section 2 and the mechanical transmission section 3 can be connected in series for the purpose of power transfer from input shaft E to the transmission output shaft A. The possible coupling of hydrodynamic transmission section 2 and mechanical transmission section 3 in series for the purpose of power transfer between the transmission input shaft and the transmission output shaft A describes the gearing branch for the power transfer between transmission input shaft E and transmission output shaft A. A second gearing branch is described, for transfer of power from the transmission input shaft E to transmission output shaft A, in this instance bypassing the hydrodynamic transmission section 2. In the following, the comments regarding the method relate to an operational mode which enables hydraulic-mechanical power transfer between the transmission input shaft and the transmission output shaft, that is, in the first gear/gearing branch via the hydrodynamic clutch 2 to the mechanical transmission section 3. The constructive design of the example transmission is described below: The secondary bucket wheel 5 is permanently connected with the mechanical transmission section 3 through a connecting shaft 7. Connecting shaft 7 can be connected with the transmission input shaft E through a bridge coupling ÜK which may also be described as a "through-coupling." The secondary bucket wheel 5 can also be connected with transmission input shaft E through this coupling. The primary bucket wheel 4 can be connected by use of a primary bucket wheel coupling PK with the transmission shaft E. The primary bucket wheel 4 is mounted on a connecting shaft 8, whereby connecting shaft 8 can be connected through the primary bucket wheel coupling PK with the transmission input shaft E. A brake component which, in this instance, is described as primary bucket wheel brake PB, is allocated to the connecting shaft 8. This primary bucket wheel brake PB is mounted rigidly on a stationary transmission component, preferably at the gear box 9, as indicated here.

The secondary bucket wheel 5 can be coupled with the second mechanical transmission section 3 through a connecting shaft 7. In the illustrated example, the second mechanical gearing part 3 includes three planetary gear sets—a first planetary gear set PRI, a second planetary gear set PRII and a third planetary gear set PRIII. The individual planetary gear sets each include at least a first sun gear, identified with I$a$ for the first planetary gear set PRI, with II$a$ for the second planetary gear set PRII, and with III$a$ for the third planetary gear set PRIII. The individual planetary gear sets also each include a ring gear, planetary gears and a fixed link. The ring gears for the individual planetary gear sets are identified here with I$b$ for the first planetary gear set PRI, with II$b$ for the second planetary gear set PRII and with III$b$ for the third planetary gear set PRIII. In the driving mode, six speed levels could, for example, be achieved with this transmission unit, whereby at least two speeds are free from the operation of the connecting coupling. In the first gear of the first operational mode, the so-called start-up gear, the primary bucket wheel clutch PK is operated and thereby connects the transmission input shaft E with the primary bucket wheel 4 through connecting shaft 8. The connection between the hydraulic transmission section 2 and the mechanical transmission section 3 is achieved through the first coupling component K1. The second and third braking elements B2 and B3 are also actuated. The hydraulic component 2, particularly the toroidal work chamber 6, is filled with operating medium in this stage. The power flow, or power transfer, requires a transmission input shaft E which is coupled indirectly with a drive motor (not shown), the primarily bucket wheel coupling PK, the primary bucket wheel 4, the secondary bucket wheel 5 through the first coupling element K1, the first planetary gear set PRI, particularly the ring gear I$b$ of the first planetary gear set onto fixed link III$d$ of the third planetary gear set and thereby the transmission output shaft A, which can be connected at least indirectly with a unit that is to be driven, for example the wheels of a vehicle.

The hydraulic transmission section 2 works as a hydrodynamic clutch during the start up process. During the transition into the second gear, the first clutch element K1, as well as the third brake element B3 remain actuated, as does the primary bucket wheel coupling PK. The second brake element B2 is released and the first brake element B1 is actuated. Since at least in the second gear the connecting coupling ÜK is also not actuated, the hydraulic gearing element 2 takes over the function of the hydrodynamic clutch within the second gear. Preferably, the connecting coupling is also not yet actuated in the third gear. However, the primary bucket wheel coupling PK, the first coupling element K1 as well as the second coupling element K2, and the third brake element B3 are actuated. All other load shifting elements are not engaged. The power flow therefore, occurs through the transmission input shaft E, the hydraulic transmission section 2, the connecting shaft 7 through the first coupling element K1 to the first planetary gear set PRI, particularly to the ring gear I$b$ of the first planetary gear set PRI. A further power segment is transferred through the second coupling element K2 to the sun gear I$a$ of the first planetary gear set PRI. The power segments that are again brought together at the fixed link I$d$ of the first planetary gear set PRI are transferred through fixed link III$d$ of the third planetary gear set PRIII to the transmission output shaft A.

In fourth gear, the first coupling element K1, the third coupling element K3, the connecting coupling ÜK, the primary bucket wheel coupling PK, as well as the second brake element B2 are actuated. None of the other power shifting elements are engaged. The fixed link II$d$ of the second planetary gear set PRII is established by use of the second brake element B2. The ring gear III$b$ of the third planetary gear set PRIII is connected with fixed link III$d$ of third planetary gear set PRIII. The power transfer occurs from the transmission input shaft E through the connecting coupling ÜK, the connecting shaft 7, the first coupling element K1 to the ring gear I$b$ of the first planetary gear set PRI, through the second planetary gear set PRII, the connecting shaft 10 to the planetary gears III$c$ of the third planetary gear set PRIII which drive the fixed link III$d$ which is coupled with ring gear III$b$, to the transmission output shaft A.

In fifth gear, only the second brake element B2 is released and the first brake element B1 is actuated, meaning that the connection between the first planetary gear set PRI and the second planetary gear set PRII, connecting shaft 11, is established. Sun gears I$a$ and II$a$ of the two planetary gear sets PRI and PRII are therefore stationary. Power transfer occurs again through the input shaft E, the bridging coupling ÜK, the connecting shaft 7, the first coupling element K1, the ring gear I$b$ of the first planetary gear set PRI and from there through the fixed link I$d$ of the first planetary gear set PRI to the fixed link III$d$ of the third planetary gear set PRIII and thereby, the transmission output shaft A.

The sixth gear differentiates from the fifth gear in that all three coupling elements K1, K2 and K3 are actuated, while all brake elements B1, B2 and B3 are released.

The shifting quality when changing from one gear to the next, substantially depends on the actuation of the individual control elements K1, K2, K3, B1, B2 and B3 in the mechanical transmission section. In a particular instance, the chronological sequence of the actuation of the "coming control element" and the release of the so-called "leaving control element" is decisive, as is the extent of the actuating forces. The "coming control elements" are those control elements or components which, during gear changes are to be engaged between two different gears, i.e. control elements that are actuated in the following selected gear. The "leaving control elements" are those control elements which, at the time a gear change is selected are still engaged or actuated in the previous gear and which are to be released at gear change.

With the help of various diagrams, FIGS. 2$a$ through 2$d$ provide simplified plots of the rotational speed/torque progressions which could possibly apply for the transmission described in FIG. 1, without the method of the invention. In particular, the relationships between the pressures imposed on the "coming" control elements over a period of time, the occurring torque changes, as well as the rotational speed changes on the drive side, that is, on the side of the transmission input shaft, as well as on the output side are given in the example. From this it becomes apparent that considerable moment distortions may occur in area I. According to the hitherto known state of the art, attempts have been made to reduce these by matching pressure progressions on the coming and/or leaving control elements.

In the method of the invention, as a solution of the problem and for the removal of the aforementioned disadvantages, a control or regulating unit 15 is allocated to gear box unit 1. Control or regulating unit 15 has at least two inputs, including a first input 16 and a second input 17, and a first output 18. The control or regulating unit 15 serves to compensate for slippage during gear changes in the mechanical transmission section 3. In particular, this relates to the slippage between the individual clutch and brake elements which are coupled with the drive or output side and which connect these for the purpose of torque transfer. The drive side in this instance is to be understood to be the area of the gear box unit 1 in which, during traction operation, power is transferred from the transmission input shaft in the direction of the transmission output shaft to a first element of the "coming" control element. The second element of the "coming" control element, which is coupled at least indirectly with the transmission output shaft A, is on the output side. Particularly in pull-shiftup situations, a suppression of the rotational speed occurs both at the transmission input shaft E and in the drive unit coupled with it when changing from one gear to the next higher gear, for example from the first gear to the second gear. The drive unit can be a combustion engine.

In the method of the invention, this rotational speed suppression is compensated by the hydrodynamic clutch 2.

This, however, applies only to shift-up situations, that is from a first lower gear to a second higher gear, during which the transfer of power occurs at least partially through the hydrodynamic clutch 2. The slippage compensation takes place by changing the fill level in the work chamber 6 of the hydrodynamic clutch 2. The fill level change is made in order to realize a substantially constant rotational pump wheel 4 speed, and, at least indirectly, a substantially constant rotational speed in the drive unit that is coupled with gear transmission 1. The hydrodynamic clutch 2 is, therefore, used for speed control. The fill level change itself may occur during an adjustment which is secondary to this control and/or speed control. To convert the speed control, an actual value that at least indirectly describes the rotational speed of the primary bucket wheel 4 of the hydrodynamic clutch 2 is measured and supplied to the first input of the control or regulating unit 15. The first input 17 can, for this purpose, be connected to a device for measuring the rotational speed of the pump wheel 4. Since, in the method of the invention, the rotational speed control is accomplished during gear changes for the purpose of slippage reduction, the second input 16 of the control or regulating unit 15 is connected to a device for establishing and/or measuring a signal for the presence of a gear change SW. In the present example, the rotational speed of transmission input shaft E is measured in order to determine the rotational speed of the pump wheel 4. The actual value $n_{EIST}$ is compared with a desired value $n_{ESOLL}$ by the control or regulating unit 15. The desired value $n_{ESOLL}$ is a determined actual value used to describe the rotational speed of the pump wheel 4 at least indirectly, and is a firmly definable value for varying operating conditions and/or a usable desired value. In the last instance, the desired value can, for example, be a rotational speed or a characterizing value which is present at the beginning of a shifting process or in the presence of a signal for a desired gear shift at the transmission input shaft E and/or the pump wheel shaft 8 of the pump wheel 4 of the hydrodynamic clutch 2. The comparison is performed in a comparator 19 whereby it is at least decided whether the difference between the desired and the actual value is zero or not equal to zero. Only in the last mentioned instance is a correcting variable given at output 18 of the control or regulating unit 15. The correcting variable affects a device 20 for at least indirectly influencing the fill level in work chamber 6 of the hydrodynamic clutch 2. In this example, device 20 acts, so to speak, as an actuator.

The following options are available for regulating the fill level:
a) Regulation of the fill level within the scope of rotational speed control; or
b) Regulation of the fill level within the scope of a fill factor control which is subordinate to the rotational speed control.

For details on the execution of rotational speed control, we refer to the comments in "Voith—Hydrodynamic in drive technology", Krauskopf Engineering Digest 1987, Chapter "Control and adjustments", which is incorporated herein by reference. The adjustment of the fill level or realization of rotational speed adjustments is not limited by a concrete implementational example. It is, however, important that a value which represents at least an indirectly characterized rotational speed of the pump wheel is set during the initial speed levels, and that this value is held constant. The embodiment of the transmission unit illustrated in FIG. 1 is only an example variation.

The control and regulating unit 15 which serves to effect the fill level change may also be designed such that additional elements, particularly control elements, are triggered in the mechanical transmission section 3. Preferably, the control or regulating unit 15 would be part of an overriding control or regulating unit. The overriding control or regulating system in vehicles would preferably be the central drive control, which serves to trigger various components in the drive train.

Corresponding to individual input values at the control or regulating unit 15, regulation of the rotational speed of the pump wheel 4 begins at the beginning of the shifting process, preferably due to appropriate fill factor control of the hydrodynamic clutch 2, whereby the rotational speed level is maintained prior to the shifting process. Shifting of gears would normally lead to a suppression or reduction of the rotational speed of the pump wheel 4 and the motor that is coupled with the input shaft E. However, the hydrodynamic clutch 2 becomes softer due to the control process and permits the necessary slippage in the hydrodynamic clutch 2. On pull upshifting for example, a fill level change in the form of a reduction occurs to compensate for the slippage. The fill level change is determined by the extent of slippage.

Figure 3:
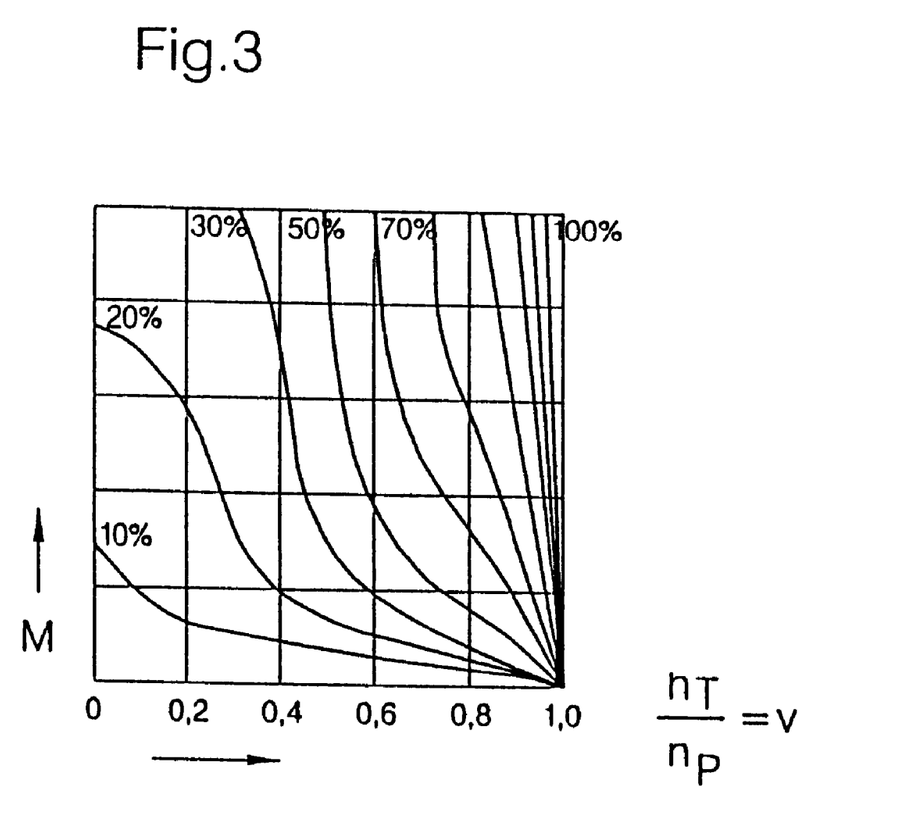
FIG. 3 is a plot of torque versus a ratio of output side rotational speed to drive side rotational speed in the apparatus of FIG. 1.

FIG. 3 clearly illustrates the dependency between filling level and slippage, which may be described by the extent of the relationship of rotational speeds of pump wheel and turbine wheel or primarily bucket wheel 4 and secondary bucket wheel 5 of the hydrodynamic clutch 2. The shifting operation does not cause changes in the motor speed. Shifting of gears can be swift, without great pressure buildup. Reduction of slippage is achieved by forced hardening of the hydrodynamic clutch 2, considering the minimum acceptable motor speed. The rotational speed control is disabled only when the slippage has been reduced to a minimum. The drive motor that is coupled with transmission input shaft E can accelerate further, that is, the hydrodynamic clutch 2 works again with maximum efficiency.

The method according to the invention in mechanical-hydrodynamic compound transmissions with clutches having bevelled blading, is primarily relevant for realization of pull-upshifting situations. In push-operation or in pull-reverse shifting, such characteristics in this type of hydrodynamic clutch are usually not important. Apart from this, that is, in clutches that have non-beveled blading, the method of the invention is relevant for all shifting operations.

Figure 4:
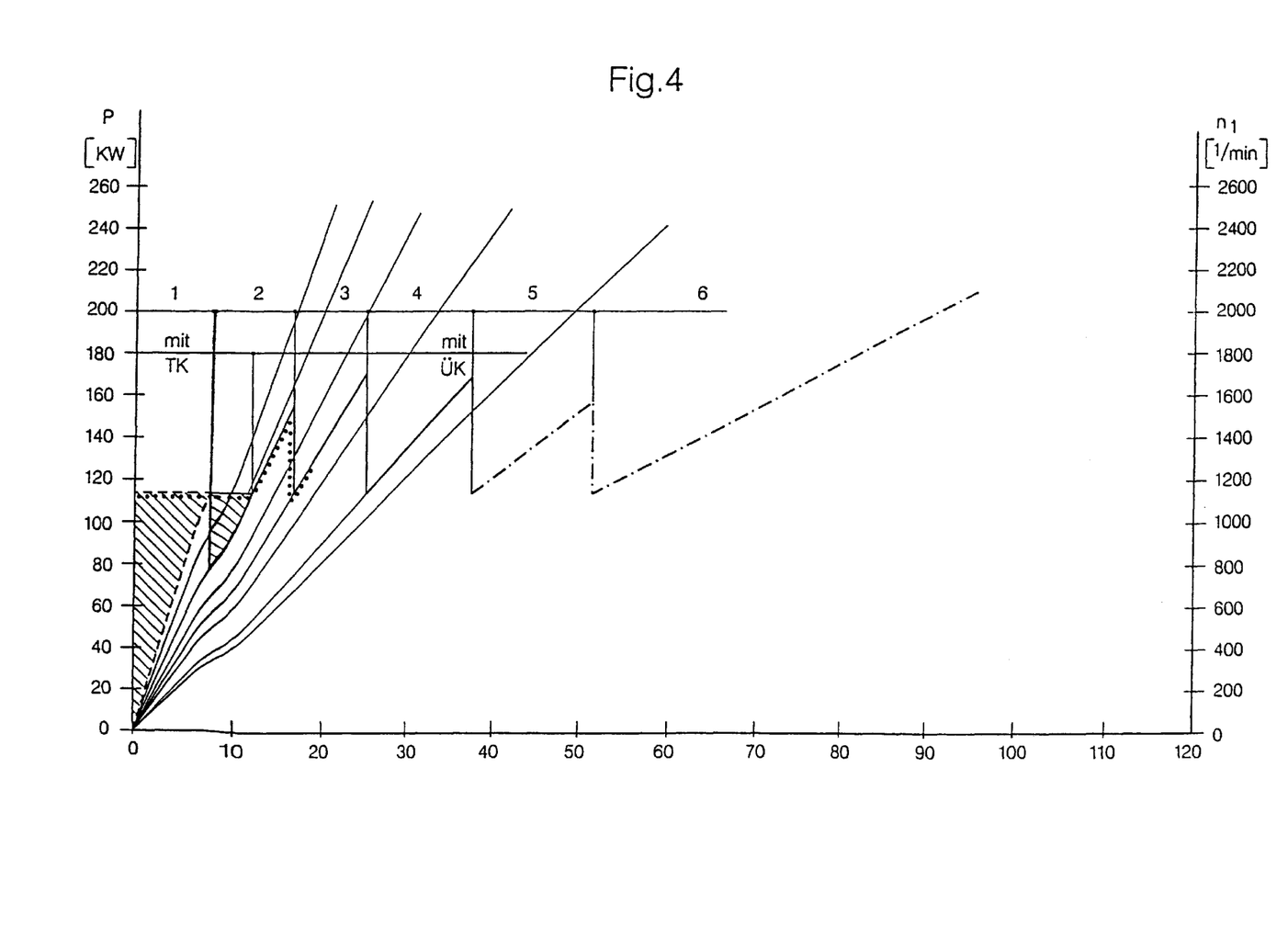
FIG. 4 is a plot of motor output versus acceleration in the apparatus of FIG. 1.

FIG. 4 illustrates in simplified form the motor output versus the acceleration. The dot-dash line indicates the behavior in a conventional transmission unit with a hydrodynamic clutch and a mechanical transmission section. The hatched area 1 is the operational area which emphasizes the operation of the hydrodynamic clutch, that is, the filling and the transfer of power through the hydrodynamic transmission element. The dotted line applies to the transmission unit and how it adjusts itself in the method of the invention. The dotted line shows that the unit operates with constant rotational speed during operation of the hydrodynamic clutch and that the differential between the two lines represents a loss in efficiency, which can be compensated by the method of the present invention.

The illustration clearly shows a transmission design in which the hydrodynamic clutch is active in the transmission of power in the first and second gear. However, other designs are also feasible.

The method of the present invention is suitable for any transmission unit that includes a hydrodynamic transmission section and a mechanical transmission section, wherein the hydrodynamic transmission section takes the form of a hydrodynamic clutch and wherein transfer of power occurs through the hydrodynamic clutch when changing gears from any optional first gear to any optional second gear. It is irrelevant if further tasks are assigned to the individual transmission components, for example, if the functions of the hydrodynamic clutch and the hydrodynamic retarder are assigned to the hydrodynamic transmission section, as is described in concrete terms in the German patent application no. 297 00 605.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of improving shifting quality during gear shifting, said method comprising the steps of:

providing a gear box unit including:
a hydrodynamic clutch including a primary bucket wheel and a fill factor;
a mechanical transmission section including at least two mechanical gear levels and a device configured for realizing at least two speeds, said mechanical transmission section being coupled in series with said hydrodynamic clutch; and
at least one gear branch configured for transferring power therethrough from said hydrodynamic clutch to said mechanical transmission section;

performing a gear shift operation between two of said mechanical gear levels;

transferring power from said hydrodynamic clutch to said mechanical transmission section during said gear shift operation; and altering said fill factor of said hydrodynamic clutch such that a variable which at least indirectly characterizes a rotational speed of said primary bucket wheel of said hydrodynamic clutch is substantially constant during a portion of said gear shift operation.

2. The method of claim 1, wherein said step of performing a gear shift operation includes the substep of attaining a synchronous rotational speed, said portion of said gear shift operation wherein said variable is substantially constant comprising a time period from a beginning of said gear shift operation to a time whereat said synchronous rotational speed is attained.

3. The method of claim 1, wherein said step of performing a gear shift operation includes the substep of attaining a synchronous rotational speed, said portion of said gear shift operation wherein said variable is substantially constant comprising a time period from a beginning of said gear shift operation to a time before said synchronous rotational speed is attained.

4. The method of claim 1, comprising the further steps of:
providing a control of said variable which at least indirectly characterizes a rotational speed of said primary bucket wheel of said hydrodynamic clutch; and
making said control inoperative when slippage occurs.

5. The method of claim 1, wherein said step of altering said fill factor includes the substeps of:
using said fill factor to regulate said variable which at least indirectly characterizes a rotational speed of said primary bucket wheel of said hydrodynamic clutch; and
controlling said fill factor.

6. The method of claim 1, wherein said step of altering said fill factor includes the substeps of:
using said fill factor to regulate said variable which at least indirectly characterizes a rotational speed of said primary bucket wheel of said hydrodynamic clutch; and
adjusting said fill factor.

7. A hydrodynamic-mechanical transmission assembly, comprising:
at least one hydrodynamic transmission section, including a hydrodynamic clutch having a primary bucket wheel with a rotational speed;
a mechanical transmission section coupled in series with said hydrodynamic clutch, said mechanical transmission section including at least one gear branch configured for transferring power therethrough from said hydrodynamic clutch, said mechanical transmission section also including a device configured for realizing at least two speeds; and
a first control unit configured for controlling said rotational speed of said primary bucket wheel of said hydrodynamic clutch during a gear shifting operation.

8. The transmission assembly of claim 7, wherein said first control unit has at least a first input, a second input and an output.

9. The transmission assembly of claim 8, further comprising a gear shifting measuring device coupled with said first input.

10. The transmission assembly of claim 9, further comprising a signal coupled with said second input, said signal being configured for one of determining and providing at least one variable which at least indirectly describes said rotational speed of said primary bucket wheel.

11. The transmission assembly of claim 10, wherein said hydrodynamic clutch includes a fill factor, said transmission assembly further comprising an influencing device coupled with said output, said influencing device being configured for influencing said fill factor of said hydrodynamic clutch.

12. The transmission assembly of claim 11, wherein said at least one variable which at least indirectly describes said rotational speed of said primary bucket wheel has an actual value, said transmission assembly further comprising a comparison device configured for comparing said actual value with a desired value and issuing a set value if said actual value is not equal to said desired value.

13. The transmission assembly of claim 12, wherein said hydrodynamic clutch includes a work chamber and a constant discharge opening, said comparison device including a control element configured for coordinating a supply to said work chamber at said constant discharge opening of said hydrodynamic clutch.

14. The transmission assembly of claim 12, wherein said hydrodynamic clutch includes an operating circuit, said comparison device including a control element configured for removing operating fluid from said operating circuit of said hydrodynamic clutch.

15. The transmission assembly of claim 12, wherein said hydrodynamic clutch includes an actuator, said comparison device including a second control unit having an input value and an output value, said input value comprising a variable which at least indirectly describes a change in said fill factor of said hydrodynamic clutch, said output value comprising said set value, said set value being for triggering said actuator of said hydrodynamic clutch.

* * * * *